US008899670B2

(12) United States Patent
Kim et al.

(10) Patent No.: US 8,899,670 B2
(45) Date of Patent: Dec. 2, 2014

(54) ROOF SIDE RAIL

(71) Applicants: Hyundai Motor Company, Seoul (KR); Kia Motors Corporation, Seoul (KR); Shin Young Co., Ltd., Yeongcheon, Gyeong Buk (KR); Sungwoo Hitech Co., Ltd., Busan (KR); MS Autotech Co., Ltd., Gyeongju, GyeongBuk (KR)

(72) Inventors: Dae Seung Kim, Gwacheon-si (KR); Chang Wook Park, Suwon-si (KR); Log Won Do, Suwon-si (KR); Sang Hoon Chae, Hwaseong-si (KR); Jang-Su Kim, Gyeongju-si (KR); Sang-Lae Lee, Ulsan (KR); Mun Yong Lee, Busan (KR); Sungyong Park, Suwon-si (KR); Dae-Ho Yang, Hwaseong-si (KR); Dae Keun Kim, Suwon-si (KR)

(73) Assignees: Hyundai Motor Company, Seoul (KR); Kia Motors Corporation, Seoul (KR); Shin Young Co., Ltd., Yeongcheon-si, Gyeongsangbuk-do (KR); Sungwoo Hitech Co., Ltd., Busan (KR); MS Autotech Co., Ltd., Gyeongiu-si, Gyeongsangbuk-do (KR)

( * ) Notice: Subject to any disclaimer, the term of this patent is extended or adjusted under 35 U.S.C. 154(b) by 0 days.

(21) Appl. No.: 14/099,627

(22) Filed: Dec. 6, 2013

(65) Prior Publication Data
US 2014/0159432 A1    Jun. 12, 2014

(30) Foreign Application Priority Data
Dec. 10, 2012 (KR) .................. 10-2012-0143094

(51) Int. Cl.
*B60R 13/07* (2006.01)
*B62D 25/06* (2006.01)
*B62D 25/04* (2006.01)

(52) U.S. Cl.
CPC ............... *B62D 25/06* (2013.01); *B62D 25/04* (2013.01)
USPC ....................................................... 296/210

(58) Field of Classification Search
CPC .. A45C 13/262; A45C 5/14; A45C 2013/267; B62B 2202/24; B62B 1/125; B60R 22/06; B60R 13/0212; B61F 5/32; B60J 5/06; B60J 5/065
USPC .................. 296/210, 203.03, 213, 216.07, 30
See application file for complete search history.

(56) References Cited

U.S. PATENT DOCUMENTS 5,941,597 A * 8/1999 Horiuchi et al. ......... 296/203.01
6,254,172 B1 * 7/2001 Takahara ................. 296/187.05

(Continued)

FOREIGN PATENT DOCUMENTS

| JP | 2002-029448 A | 1/2002 |
| JP | 2005-081421 A | 3/2005 |

*Primary Examiner* — Kiran B Patel
(74) *Attorney, Agent, or Firm* — McDermott Will & Emery LLP

(57) ABSTRACT

A roof side rail is connected to a roof panel and includes a multi-sectional rail having a plurality of integrally formed ribs and bent along a shape of an upper portion of a side surface of a vehicle body, and a reinforcement rail that is combined with an inner side surface of the rail, an upper side flange is connected to the roof panel, and a lower side flange is engaged with a weather strip.

8 Claims, 4 Drawing Sheets

(56) References Cited

U.S. PATENT DOCUMENTS

| | | | |
|---|---|---|---|
| 6,267,436 B1 * | 7/2001 | Takahara | 296/187.05 |
| 6,554,350 B2 * | 4/2003 | Takahara | 296/187.05 |
| 6,854,786 B2 * | 2/2005 | Berglund et al. | 296/146.9 |
| 6,854,795 B2 * | 2/2005 | Yamazaki et al. | 296/209 |
| 7,976,098 B2 * | 7/2011 | Nishimura et al. | 296/193.06 |
| 7,988,182 B2 * | 8/2011 | Park | 280/728.2 |
| 8,366,183 B2 * | 2/2013 | Ishigame et al. | 296/193.06 |
| 8,419,113 B2 * | 4/2013 | Kunishi et al. | 296/193.06 |
| 8,439,432 B2 * | 5/2013 | Nusier et al. | 296/210 |
| 8,678,484 B2 * | 3/2014 | Shono | 296/203.03 |
| 2001/0020794 A1 * | 9/2001 | Ishikawa | 296/188 |
| 2006/0055209 A1 * | 3/2006 | Hoshino | 296/203.03 |
| 2008/0001437 A1 * | 1/2008 | Balzer et al. | 296/203.03 |
| 2010/0140982 A1 * | 6/2010 | Hosaka et al. | 296/210 |
| 2011/0121614 A1 * | 5/2011 | Kobayashi et al. | 296/210 |
| 2011/0248527 A1 * | 10/2011 | Ono | 296/210 |
| 2014/0054927 A1 * | 2/2014 | Nakamura et al. | 296/193.06 |
| 2014/0138988 A1 * | 5/2014 | Kisaku et al. | 296/210 |
| 2014/0225399 A1 * | 8/2014 | Ono | 296/210 |

* cited by examiner (S1)   (S2)

ROOF SIDE RAIL

CROSS-REFERENCE TO RELATED APPLICATION

This application claims priority to and the benefit of Korean Patent Application No. 10-2012-0143094 filed in the Korean Intellectual Property Office on Dec. 10, 2012, the entire contents of which are incorporated herein by reference.

BACKGROUND

1. Technical Field

The present disclosure relates to a roof side rail. More particularly, the present disclosure relates to a roof side rail in which an extruded pipe having ribs integrally formed therein is formed by bending to be welded to a roof panel.

2. Background

Generally, a roof side rail is a member that is disposed at an upper portion of a side surface of a vehicle body to improve a performance of a vehicle body.

FIG. 1 is a cross-sectional view of each side of a roof side rail according to a conventional art.

Referring to FIG. 1, the roof side rail 101 is disposed from a front side to a rear side of a vehicle body 100 and connects main members to improve twist strength, bending strength, and roof strength.

When the roof side rail 101 is applied to a vehicle body, the following need to be taken into consideration. The sectional size has to be limited for securing viewing angle of a front pillar (A pillar) and for aesthetical reasons, and the strength of the rail is improved by preventing component separation.

The roof side rail 101 includes a side outer panel 111 and a side inner panel 113 that are assembled, and an upper side portion thereof is welded to a roof panel (not shown).

That is, a side outer panel 111 and a side inner panel 113 are spot welded through a flange portion (F) at an upper side of the roof side rail 101.

A space portion (S) is formed between the side outer panel 111 and the side inner panel 113 and a reinforcement panel 115 that is similar to the shape of the side outer panel 111 is disposed in the space portion (S) to improve the vertical strength of a connection portion with a roof panel (not shown).

In this case, both ends of the reinforcement panel 115 are interposed between the side outer panel 111 and the side inner panel 113 of each flange portion (F) to be integrally spot welded.

However, in the roof side rail 101 according to the above conventional design, the side outer panel 111, the side inner panel 113, and the reinforcement panel 115 are overlapped through the flange portion (F) of both ends, the overlapped portion is combined through spot welding, but the strength of the welding portion is low and the number of components is increased by adding the reinforcement panel 115 for improving the strength.

Also, the conventional roof side rail 101 is made by combining a plurality of panels, and therefore there is a drawback in designing a sectional shape and size so as to improve strength and secure viewing angle of a front pillar (A pillar).

The above information disclosed in this Background section is only for enhancement of understanding of the background of the disclosure.

SUMMARY

The present disclosure provides a roof side rail formed by bending a multi-sectional extruded pipe. The pipe includes a plurality of integrally formed ribs such that the strength of a vehicle body and a roof are improved, the number of components is reduced, and the design becomes flexible.

A roof side rail that is connected to a roof panel according to an exemplary embodiment of the present disclosure may include a rail having a plurality of integrally formed ribs to have a multi-sectional structure and bent along a shape of an upper portion of a side surface of a vehicle body, and a reinforcement rail that is combined with an inner side surface of the rail. An upper side flange is connected to the roof panel, and a lower side flange is engaged with a weather strip.

The rib may include a lower side rib that connects an outside interior section of the rail and an inside interior section of the rail in a first direction and an upper side rib that connects the outside interior section of the rail and and the inside interior section of the rail in a second direction different than the first direction.

An edge portion of the rail may have a round shape.

The rail may include an extruded pipe in which the plurality of ribs are integrally formed therein.

The reinforcement rail may include a panel that is formed by pressing along an inner side surface of the rail.

The reinforcement rail may be continuously welded to an upper side end portion and a lower side end portion of an inner side surface of the rail and is welded to an upper side and a lower side of an inner side surface of the rail in one direction.

The continuous welding may be one of $CO_2$ welding, MIG welding, TIG welding, or laser hybrid welding.

The one side direction welding may be one of laser welding, one side direction spot welding, a rivet union, or a screw union.

An exemplary embodiment of the present disclosure prevents the roof side rail from becoming wider through two ribs that connect an outside with an inner side of the section such that the strength of the roof is secured to satisfy high load.

Also, a multi-sectional extruded pipe having ribs integrally formed therein is bent to form a rail such that the number of the components is reduced, the weight is reduced, and the design becomes more flexible.

Also, the strength is improved by adding a reinforcement rail that is welded on the roof panel without a separate reinforcement panel to improve overall strength and assembly feature.

Also, an edge portion of the rail has a round surface to prevent the stress concentration.

DETAILED DESCRIPTION

Hereinafter, an exemplary embodiment of the present disclosure will be described in accordance with accompanying drawings.

Figure 1:
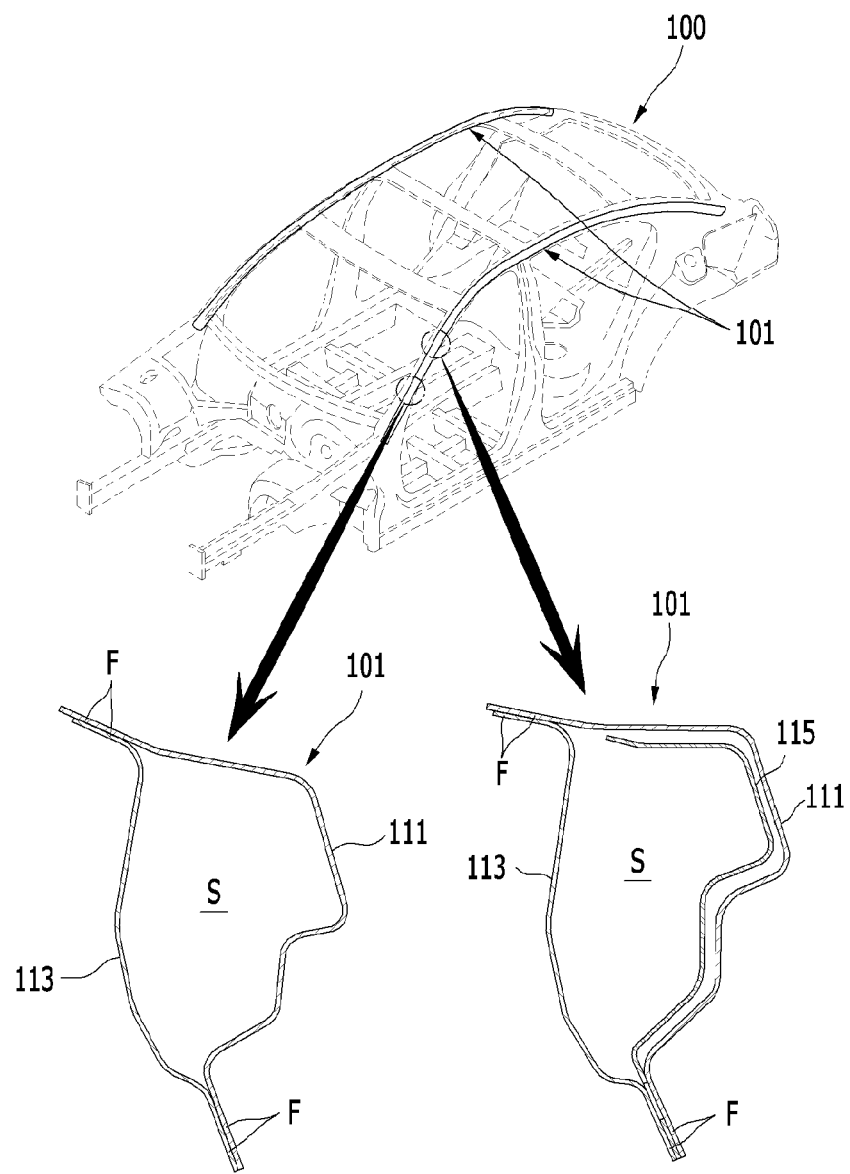
FIG. 1 is a cross-sectional view of each side of a conventional roof side rail.
Figure 2:
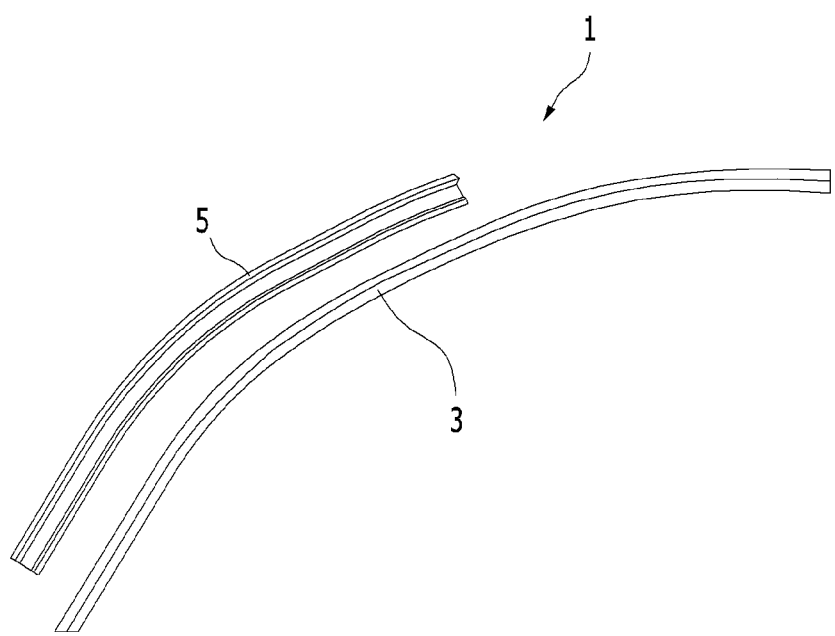
FIG. 2 is an exploded perspective view of a roof side rail according to an exemplary embodiment of the present disclosure.
Figure 3:
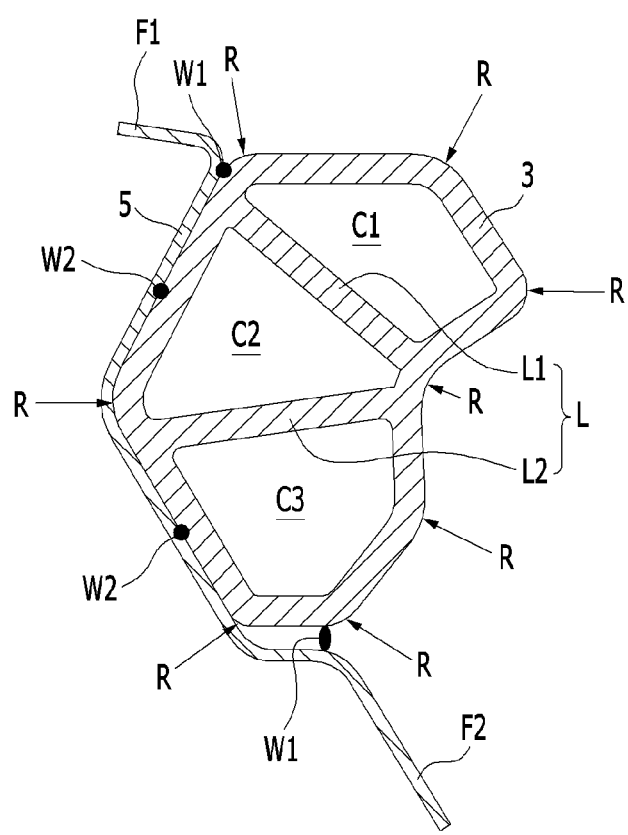
FIG. 3 is a cross-sectional view of a roof side rail according to an exemplary embodiment of the present disclosure.

FIG. 2 is an exploded perspective view of a roof side rail according to an exemplary embodiment of the present disclosure, and FIG. 3 is a cross-sectional view of a roof side rail according to an exemplary embodiment of the present disclosure.

Referring to FIG. 2 and FIG. 3, a roof side rail 1 includes a rail 3 and a reinforcement rail 5 according to an exemplary embodiment of the present disclosure.

The rail 3 may include two ribs L, which may be labeled L1 and L2, that are integrally formed. Three closed spaces C1, C2, and C3 are formed by the two ribs L. The rail 3 may be formed by bending along a shape of an upper portion of a side surface of a vehicle body.

The rail 3 is formed by an extruded pipe element, wherein two ribs L are integrally extruded.

In this case, the ribs L include a lower side rib L2 that connects an outside interior section of the rail 3 with an inside interior section of the rail 3 in a first direction and an upper side rib L1 that connects the outside interior section of the rail 3 with the inside interior section of the rail 3 in a second direction different than the first direction. In the embodiment shown in FIG. 3, the first direction may be a diagonal direction, and the second direction may be a width direction.

Each edge of the rail 3 may have a round surface R.

The reinforcement rail 5 may be combined on an inner side surface of the rail 3 and the reinforcement rail 5 may be a panel formed by a pressing process along an inner side surface shape of the rail 3.

An upper side flange F1 that is connected to the roof panel (not shown) may be formed at an upper side of the reinforcement rail 5, and a lower side flange F2 that a weather strip is disposed thereon is formed at a lower side of the reinforcement rail 5.

Meanwhile, a continuous welding portion W1 that is formed at an upper side portion and a lower side portion of an inner side surface of the rail 3 is formed along a length direction of the reinforcement rail 5, and one side direction welding portion W2 is formed at an upper side portion and a lower side portion of an inner side surface of the rail 3.

That is, the continuous welding portion W1 can be any one of $CO_2$ welding, MIG welding, TIG welding, or laser hybrid welding, and one side direction welding portion W2 can be laser welding, one side direction spot welding, a rivet union, or a screw union.

Accordingly, the roof side rail 1 as described above may include a rail 3 having two ribs L integrally formed inside the rail 3 and a multi-sectional extruded pipe structure bent such that the strength of the vehicle body and the roof are improved.

Also, the rail 3 may be formed by an extruding process to reduce the number of the components. In addition, a viewing angle of a front pillar or A pillar and aesthetical features are secured to satisfy design conditions, and the design increases flexibility.

Figure 4:
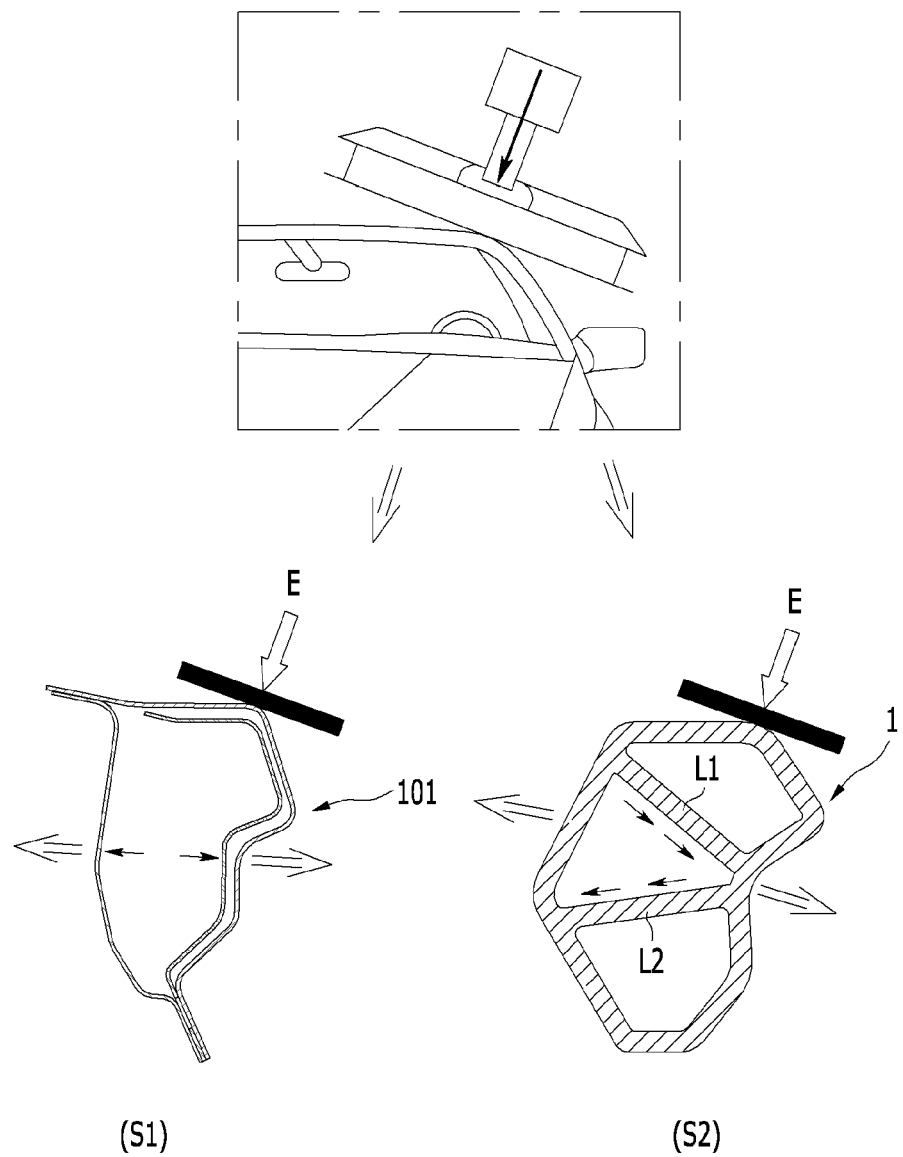
FIG. 4 is a cross-sectional view showing a roof test method of a roof side rail according to a conventional art and an exemplary embodiment of the present disclosure.

FIG. 4 is a cross-sectional view showing a roof test method of a conventional roof side rail and a roof side rail according to an exemplary embodiment of the present disclosure.

As shown in FIG. 4, when the strength of the conventional roof side rail 101 is tested S1, an input load E is applied to one side of the rail 101 and a central portion thereof becomes wider. However, when the roof side rail 1 according to an exemplary embodiment of the present disclosure is tested S2, the roof side rail 1 does not become wider because of the two ribs L that connect an outside with an inner side of the section such that the strength of the roof is secured to satisfy high load.

Also, the section of the roof side rail 1 is divided into three closed areas C1, C2, and C3 by two ribs L to increase section coefficient and edge portion of the rail has round shape to prevent the stress concentration.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A roof side rail that is connected to a roof panel, comprising:
    a rail including a plurality of integrally formed ribs having a multi-sectional structure and bent along a shape of an upper portion of a side surface of a vehicle body; and
    a reinforcement rail combined with an inner side surface of the rail, an upper side flange is connected to the roof panel, and a lower side flange is engaged with a weather strip.

2. The roof side rail of claim 1, wherein the rib includes a lower side rib configured to connect an outside interior section of the rail and an inside interior section of the rail in a first direction and an upper side rib that connects the outside interior section of the rail and the inside interior section of the rail in a second direction different than the first direction.

3. The roof side rail of claim 1, wherein an edge portion of the rail has a round shape.

4. The roof side rail of any one of claim 1 to claim 3, wherein the rail includes an extruded pipe in which the plurality of ribs are integrally formed therein.

5. The roof side rail of claim 1, wherein the reinforcement rail includes a panel pressed along an inner side surface of the rail.

6. The roof side rail of claim 1 or claim 5, wherein the reinforcement rail is continuously welded to an upper side end portion and a lower side end portion of an inner side surface of the rail, and is welded to an upper side and a lower side of an inner side surface of the rail in one direction.

7. The roof side rail of claim 6, wherein the continuous welding is one of $CO_2$ welding, MIG welding, TIG welding, or laser hybrid welding.

8. The roof side rail of claim 6, wherein the one side direction welding is one of laser welding, one side direction spot welding, a rivet union, or a screw union.

* * * * *